(12) United States Patent
Di Francescantonio et al.

(10) Patent No.: US 11,983,803 B2
(45) Date of Patent: May 14, 2024

(54) METHOD FOR REPRESENTING OBJECTS OF A NETWORK IN A GUI WITH A GRAPH CLUSTERING

(71) Applicant: Nozomi Networks Sagl, Mendrisio (CH)

(72) Inventors: Paolo Di Francescantonio, Castronno (IT); Alessandro Cavallaro Corti, Varese (IT); Moreno Carullo, Gavirate (IT); Andrea Carcano, San Francisco, CA (US)

(73) Assignee: Nozomi Networks Sagl, Mendrisio (CH)

( * ) Notice: Subject to any disclaimer, the term of this patent is extended or adjusted under 35 U.S.C. 154(b) by 213 days.

(21) Appl. No.: 17/591,504

(22) Filed: Feb. 2, 2022

(65) Prior Publication Data
US 2023/0245357 A1    Aug. 3, 2023

(51) Int. Cl.
*G06T 11/20*      (2006.01)
*H04L 41/22*      (2022.01)

(52) U.S. Cl.
CPC ............ *G06T 11/206* (2013.01); *H04L 41/22* (2013.01); *G06T 2200/24* (2013.01)

(58) Field of Classification Search
CPC .......................... G06T 11/206; G06T 2200/24
See application file for complete search history.

(56) References Cited

U.S. PATENT DOCUMENTS

| | | | |
|---|---|---|---|
| 2017/0084064 A1* | 3/2017 | Glover | G06T 7/162 |
| 2017/0221240 A1* | 8/2017 | Stetson | G06F 16/9024 |
| 2018/0095632 A1* | 4/2018 | Leeman-Munk | G06F 3/04812 |

* cited by examiner

*Primary Examiner* — Michelle L Sams
(74) *Attorney, Agent, or Firm* — DeFrancescoLaw; Jason Lee DeFrancesco

(57) ABSTRACT

The present invention relates to a method for representing objects of a network in a GUI with a graph clustering comprising retrieving a base graph comprising all of the objects of the network as respective nodes and links between said nodes, grouping two or more of the nodes in one or more clusters, initializing the clusters by calculating the cluster mass and the cluster radius of each of the clusters, assessing the clusters defining a visualization graph which represents the base graph as seen from a predefined distance value and positioning the visualization graph in the GUI, wherein the assessing comprises creating an empty visualization graph, calculating for each of the clusters the distance ratio as ratio between the cluster radius and the predefined distance value, evaluating the distance ratio with regard to a predefined distance ratio threshold, compressing the cluster when the distance ratio is higher than the predefined distance ratio threshold, adding in the visualization graph a single compressed cluster node for all child nodes and all child clusters arranged inside the cluster to be compressed, expanding the cluster when the distance ratio is lower than the predefined distance ratio threshold, adding in the visualization graph a plurality of nodes for all child nodes and all child clusters arranged inside the cluster to be expanded and adding in the visualization graph a link between the cluster and the node outside the cluster if the link was present between a node inside the cluster and the node outside the cluster in the base graph and a link between two of the clusters if the link was present between a node inside one of the clusters and a node inside the other of the clusters in the base graph, wherein every time a link needs to be added between the same of the cluster and of the node outside the cluster a count of a link strength is increased of an integer unit and wherein every time a link needs to be added between the same of two of the clusters a count of a link strength is increased of an integer unit.

12 Claims, 5 Drawing Sheets

METHOD FOR REPRESENTING OBJECTS OF A NETWORK IN A GUI WITH A GRAPH CLUSTERING

FIELD OF INVENTION

The present invention relates to the field of graphic user interface (GUI). In particular, the present invention relates to a method for representing objects of a network in a GUI with a graph clustering.

BACKGROUND ART

A graphical user interface (GUI) is a form of user interface that allows users to interact with electronic devices through graphical icons and indicator instead of text-based user interfaces. Designing the visual composition and temporal behavior of a GUI is an important part of software application programming in the area of human-computer interaction. Its goal is to enhance the efficiency and ease of use for the underlying logical design of a stored program, while the actions in a GUI are usually performed through direct manipulation of the graphical elements.

In particular, the term GUI usually refers to the visible graphical interface features of an application. Users may interact with information by manipulating visual widgets that allow for interactions appropriate to the kind of data they hold. The widgets of a well-designed interface are selected to support the actions necessary to achieve the goals of users.

In the field of the management of computer network infrastructures, of great importance is the use of GUI to simplify the representation, at user level, of the multitude of connections and data exchanges involved. In particular, in order to monitor and protect large modern OT/IOT/IT computer networks one fundamental prerequisite is the need to ensure a good network visibility, in other words there is the need to have a clear visibility of all the computers/devices present in the network and of all the communications that happens among them.

A kind of GUI employed to ensure a proper network visibility is the network graph, wherein each computer or device in the network is represented as a node, and the communications among them are represented as links that connects the nodes. In a network graph, in order to have a clear visualisation of all components, there is the need to dispose the nodes in such a way as to be well spaced to each other, wherein the nodes that are directly connected by a link should be placed closed to each other and if a new node or link appears in a new iteration the position of other nodes should not change in a substantive way.

The visualization of complex network graphs with thousand or millions of nodes presents several demanding issues. One is the performances of the visualization system that has to be fast enough to make feasible an interactive user experience. The other is the usability of the network graph since the graph visualization has to be simple and clear enough that the user can effectively take advantage of it.

If a very large graphs with millions of nodes is considered, a simple visualization with all the nodes shown in the same window will be almost useless since the user has no way to orient himself inside the network graph.

To solve this issue a common approach is the graph clustering, that consist substantially in grouping together several nodes in a single macro-node called cluster and visualizing each cluster as a single element. Then when the user explicitly requests it, or when zoom-in, the clusters can be expanded to show the nodes that compose it.

The implementation of a such as this network mph visualization requires to address two main issues. The first one is the cluster calculation usually referred simply as clustering that consists, starting from a given network graph, in associating each node to a cluster. Several different methods are available for clustering. To ensure scalability for large network graph it is also common that clusters can be nested to each other arranged in a parent/child tree. Inside a high-level cluster several children subclusters can be present that can themselves contain other subclusters and so on. The cluster that contains some other cluster is referred as parent cluster and the contained ones(s) are referred as child(s). Once that the clustering is available the other issue is the method to be used to visualize the clustered network graph and perform the expansion (from a situation in which a cluster is visible show the nodes inside the cluster) and contraction (from a situation in which the nodes are visible show just the cluster that include them).

Several methods are known for drawing clustered graphs.

Some methods are referred as "layout adjustment" approaches. They require a preliminary disposition of all the nodes and once that this disposition is available an adjustment process is used to extract cluster position and visualize them. For large graphs however these approaches do not ensure the required scalability. Consider for example a clustered graph with a few high-level clusters and a huge number of subclusters and nodes. These approaches require to render all the nodes just to show the few high-level clusters with a huge resource and time consumption.

Different approaches are based on the usage of spring forces to draw nodes inside their clusters, but also in this case the calculation has to be done for all the nodes even if just a few high-level clusters are shown.

In further different approaches, clustered graphs are used in combination with multilevel techniques and force approaches to draw large graphs but in this case the focus is on the final rendering of the complete graph and not on a dynamic visualization.

It would therefore be desirable to represent objects and connections of a network in a way to be comprehensible from a user side. In particular, it would be desirable to provide a representation of a network graph GUI which involves a small amount of computational resources, while allowing a smooth transition in expansion and contraction of clustered graphs.

BRIEF DESCRIPTION OF THE INVENTION

The object of the present invention is to provide a method for representing objects and their network connection capable of minimizing the aforementioned drawbacks. In particular, it would be desirable to have a method capable to represent an overall network in each iteration using few computational resources by clustered graphs.

According to the present invention is described, therefore, a method for representing objects of a network in a GUI with a graph clustering.

The method comprises:
  retrieving a base graph comprising all the objects of the network as respective nodes and links between the nodes, wherein to each of the nodes is assigned a predefined node mass;
  grouping two or more of the nodes in one or more clusters, by a computerized data processing unit, wherein each of the clusters comprises at least two of the nodes;

initializing the clusters, by the computerized data processing unit, by calculating the cluster mass and the cluster radius of each of the clusters;

assessing the clusters, by the computerized data processing unit, defining a visualization graph which represents the base graph as seen from a predefined distance value; and positioning the visualization graph in the GUI;

wherein the cluster mass of each of the clusters is calculated as sum of the node masses of all the nodes arranged inside the cluster and of the child cluster masses of all the child clusters arranged inside of the cluster, wherein the cluster radius of each of the cluster is calculated as product of the cluster mass with a predefined radius constant;

wherein the assessing comprises:

creating an empty visualization graph;

calculating, by the computerized data processing unit, for each of the clusters the distance ratio as ratio between the cluster radius and the predefined distance value;

comparing the distance ratio, by the computerized data processing unit, with regard to a predefined distance ratio threshold;

compressing the cluster, by the computerized data processing unit, when the distance ratio is higher than the predefined distance ratio threshold, adding in the visualization graph a single compressed cluster node for all child nodes and all child clusters arranged inside the cluster to be compressed;

expanding the cluster, by the computerized data processing unit, when the distance ratio is lower than the predefined distance ratio threshold, adding in the visualization graph a plurality of nodes for all child nodes and all child clusters arranged inside the cluster to be expanded; and adding, by the computerized data processing unit, in the visualization graph a link between two nodes if the same link between the same two nodes is present in the base graph;

adding, by the computerized data processing unit, in the visualization graph a link between a cluster and a node outside the cluster if a link was present between a node inside the cluster and the node outside the cluster in the base graph, wherein every time a link needs to be added between the same of the cluster and of the node outside the cluster a count off link strength is increased of an integer unit; and adding by the computerized data processing unit, in the visualization graph a link between two of the clusters if a link was present between a node inside one of the clusters and a node inside the other of the clusters in the base graph, wherein every time a link needs to be added between the same of two of the clusters a count of a link strength is increased of an integer unit.

In a further embodiment, the assessing and the positioning are iterated when the predefined distance value is changed.

In a further embodiment, in the assessing the clusters are compressed if they are outside a predefined visualization window as a portion of the two-dimensional space in which the visualization graph is visualized in the GUI, In a further embodiment, the positioning of the visualization graph comprises:

assigning initial position to all of the nodes and of the cluster nodes;

computing the forces acting on each of the nodes and cluster nodes;

defining new position for the nodes and cluster nodes by means of a velocity verlet algorithm;

storing the new positions;

iterating the computing, the defining and the storing until nodes and cluster nodes positions becomes stable.

In a further embodiment, the assigning initial position consists of assigning to all of the nodes and cluster nodes inside an expanded of the clusters the coordinates of the cluster node position if the cluster has never been expanded before.

In a further embodiment, the assigning initial position consists of assigning to all of the nodes and of the cluster nodes inside an expanded of the clusters the coordinates of the relative positions with respect to the cluster center position if the cluster has already been expanded.

In a further embodiment, the storing comprises memorizing the cluster center position calculated as:

$$xc = \frac{\sum_{i=0}^{n} m_i * x_i}{\sum_{i=0}^{n} m_i} \quad yc = \frac{\sum_{i=0}^{n} m_i * y_i}{\sum_{i=0}^{n} m_i}$$

wherein:

xc is the coordinate of cluster center along the x axis;

yc is the coordinate of cluster center along the y axis;

$m_i$ is the mass of the $i^{th}$ cluster element inside the cluster;

$x_i$ is the coordinate of the $i^{th}$ cluster element along the x axis; and $y_i$ is the coordinate of the $i^{th}$ cluster element along the y axis.

N is the number of elements inside the cluster

In a further embodiment, the storing comprises memorizing the relative positions calculated as:

$$xr_i = x_i - xc$$

$$yr_i = y_i - yc$$

wherein:

$xr_i$ is the coordinate of the $i^{th}$ cluster element relative to the coordinate of cluster along the x axis;

$yr_i$ is the coordinate of the $i^{th}$ cluster element relative to the coordinate of the cluster center along the y axis;

xc is the coordinate of cluster center along the x axis;

yc is the coordinate of cluster center along the y axis;

$x_i$ is the coordinate of the $i^{th}$ cluster element along the x axis; and $y_i$ is the coordinate of the $i^{th}$ cluster element along the y axis In a further embodiment, the computing the forces acting on each of the nodes and cluster nodes comprises computing link forces of the link as:

$$Flx_{b-a} = K*S*(x_b - x_a)$$

$$Fly_{b-a} = K*S*(y_b - y_a)$$

and $$Flx_{a-b} = K*S*(x_a - x_b)$$

$$Fly_{a-b} = K*S*(y_a - y_b)$$

respectively for the two nodes or cluster nodes "a" and "b" that form the link, wherein:

K is a predefined elastic constant;

S is the strength of the link;

$x_a$, $y_a$ are coordinates of the "a" node;

$x_b$, $y_b$ are coordinates of the "b" node;

$Flx_{b-a}$ the x component of the force that node "b" exerts on node "a";

$Fly_{b-a}$ is the y component of the force that node "b" exerts on node "a";

$Flx_{a-b}$ is the x component of the force that node "a" exerts on node "b"; and $Fly_{a-b}$ is the y component of the force that node "a" exerts on node "b".

In a further embodiment, the computing; the forces acting on each of the nodes and cluster nodes comprises computing gravitational forces between each couple of the nodes and/or cluster nodes identifying the source and the receiver as:

$$Fx = G*Ms*Mr*(xs-xr)/d^3$$

$$Fy = G*Ms*Mr*(ys-yr)/d^3$$

wherein:
Ms is the mass of the source;
Mr is the mass of the receiver;
xs, ys are the coordinates of the source;
xr, yr, are the coordinates of the receiver;
d is the distance between the source and the receiver positions;
G is a predefined gravitational constant;
Fx is the x component of the force that the source exerts on the receiver; and
Fy is the y component of the force that the source exerts on the receiver.

In a further embodiment, the computing the forces acting on each of the nodes and cluster nodes comprises computing damping forces for each of the nodes and/or cluster nodes as:

$$Fdx = D*Vx$$

$$Fdy = D*Vy$$

wherein:
Vx is the velocity of the node or cluster node along the x axis;
Vy is the velocity of the node or cluster node along the y axis;
D is a predefined damping constant;
Fdx is the x component of the damping force acting on node or cluster node; and
Fdy is the y component of the damping force acting on node or cluster node.

In a further embodiment, the computing the forces acting on each of the nodes and cluster nodes comprises computing central force for each of the nodes and/or cluster nodes as:

$$Fcx = C*x + \sum_{i=0}^{N} C*level_i*(x-xc_i)$$

$$Fcy = C*y + \sum_{i=0}^{N} C*level_i*(y-yc_i)$$

wherein:
C is a predefined constant;
N is the number of clusters at which the node or cluster node recursively belongs;
$Level_i$ is the level of the $i^{th}$ cluster at which the node or cluster node belongs;
$xc_i$ is the center coordinate along the x axis of the $i^{th}$ cluster at which the node or cluster node belongs;
$yc_i$ is the center coordinate along the y axis of the $i^{th}$ cluster at which the node or cluster node belong;
x is the coordinate of the node or cluster node along the x axis;
y is the coordinate of the node or cluster node along the y axis;
Fcx is the x component of the central force acting on node or cluster node; and
Fcy is the y component of the central force acting on node or cluster node In a further embodiment the assigning initial position consists in assigning to all nodes and cluster nodes inside an expanded cluster the coordinate of the cluster center if the cluster has never been expanded before, or the coordinate of the cluster center itself plus the node or cluster node relative coordinate if the cluster has already been expanded and the storing executed.

DESCRIPTION OF THE FIGURES

These and further features and advantages of the present invention will become apparent from the disclosure of the preferred embodiments, illustrated by way of a non-limiting example in the accompanying figures, wherein.

DETAILED DESCRIPTION OF THE INVENTION

Figure 1:
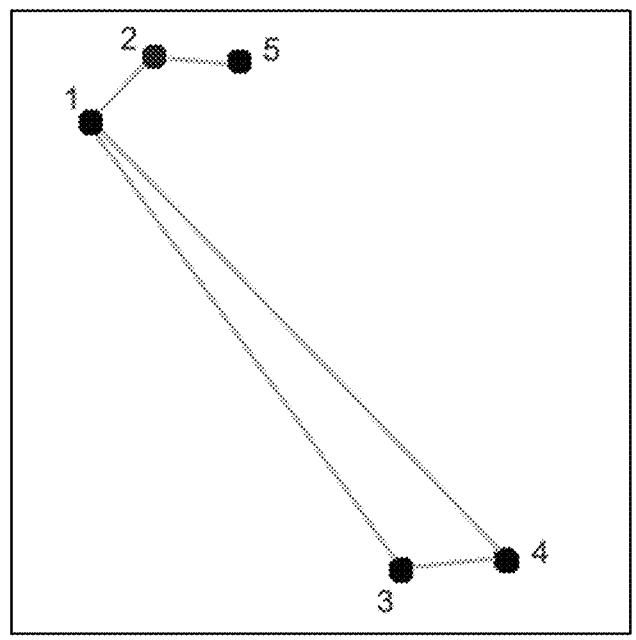
FIG. 1 shows a GUI with a first graph representing a plurality of nodes.

The present invention relates to method for representing objects of a network in a GUI with a graph clustering.

The method according to the present invention finds a useful application in any kind of physical infrastructures or automation systems connected in a network, in particular in industrial automation systems, such as industrial processes for manufacturing production, industrial processes for power generation, infrastructures for distribution of fluids (water, oil and gas), infrastructures for the generation and/or transmission of electric power, infrastructures for transport management. Moreover, it finds useful application with all the technology environments, including Information Technology (IT), Operation Technology (OT) and Internet of Things (IoT).

The term "cluster" relates, in the present invention, to an element that contains one or more nodes and or sub-clusters.

The term "compressed cluster" relates, in the present invention, to cluster for which the internal nodes and sub-clusters are not visible.

The term "expanded cluster" relates, in the present invention, to a cluster for which the internal nodes and subclusters are visible.

The term "cluster node" relates, in the present invention, to a node that is used to represent in the GUI a compressed cluster.

The term "cluster elements" relates, in the present invention, to the nodes or cluster nodes that are contained in a cluster.

The term "child cluster" or "subcluster" relates, in the present invention, to a cluster contained in a cluster of lower cluster level.

The term "parent cluster" relates, in the present invention, to a cluster which contains one or more cluster of upper cluster level.

The term "cluster level" relates, in the present invention, to a position of a cluster with respect to any child cluster or parent cluster. For example, a cluster level is identified by an integer number that is 1 if the cluster has no parent cluster, 2 if the cluster has a parent cluster that in turn has no parent cluster, 3 if the cluster has a parent cluster that in turn has a further parent cluster, and so on.

The term "visualization window" relates, in the present invention, to a portion of the two-dimensional space in which the visualization graph is visualized in the GUI.

According to the present invention is described, therefore, a method for representing objects of a network in a GUI with a graph clustering.

The method will be described in the following taking into account two simple examples as respectively illustrated in FIGS. 1 and 5 but, of course, it can be scaled to any kind of complexity.

Moreover, the method according to the present invention can refer to, and can be carried out in connection with, the U.S. patent application Ser. No. 17/187,821 filed on Feb. 28, 2021, to which reference is made and which is herewith incorporated herein by reference, with regard to a method for representing objects of a network in a GUI to reduce the complexity of the gravitational forces evaluation. In this regard, the aforementioned examples of FIGS. 1 and 5 correspond to the same simple examples of the aforementioned U.S. patent application Ser. No. 17/187,821.

FIG. 1 illustrates a first example, to be processed according to the method of the present invention, which comprises five nodes numbered from 1 to 5. These nodes represent corresponding objects in a network.

The method comprises first retrieving a base graph comprising all of the objects of the network as respective nodes and links between the nodes. FIG. 1 illustrates an example of such base graph that will be described in greater details in the following, provided with the aforementioned nodes and links between them. Each of the nodes is initialized with a predefined node mass which in the present example is equal to 1 for all nodes.

The five nodes in the graph of FIG. 1 are numbered from 1 to 5, using integer values, and the following links are shown: a link from node 1 to node 2, a link from node 2 to node 5, a link from node 1 to node 3, a link from node 1 to node 4 and finally a link from node 3 to node 4. Such a graph can be represented with the following notation:

Nodes=[{name="1", mass=1},
 {name="2", mass=1},
 {name="3", mass=1},
 {name="4", mass=1},
 {name="5", mass=1}]

Links={nodes="1-2", strength=1},
 {nodes="2-5", strength=1},
 {nodes="1-3", strength=1},
 {nodes="1-4", strength=1},
 {nodes="3-4", strength=1}].

The method further comprises grouping two or more of the nodes in one or more clusters, by a computerized data processing unit, wherein each of the clusters comprises at least two of the nodes.

In particular, the nodes corresponding to the first example of FIG. 1 are clustered defining a first cluster named Cluster 1, which comprises nodes 1, 2 and 5 and no parent cluster, and a second cluster named Cluster 2, which comprises nodes 3 and 4 and no parent cluster, summarized as:

Cluster 1: comprises nodes 1, 2, 5—no parent cluster;
Cluster 2: comprises nodes 3, 4—no parent cluster.

Subsequently, the method further comprises initializing the clusters, by the computerized data processing unit, by calculating the cluster mass and the cluster radius of each of the clusters. The cluster mass of each of the clusters is calculated as sum of the node masses of all of the nodes arranged inside the cluster and of the child cluster masses of all of the child clusters arranged inside of the cluster. Moreover, the cluster radius of each of the cluster is calculated as product of the cluster mass with a predefined radius constant. Therefore, considering a predefined radius constant named KR and equal to 10, Cluster 1 has a mass equal to 3 and a corresponding radius equal to 30, while Cluster 2 has a mass equal to 2 and a corresponding radius equal to 20. Of course, it is still possible to make use of predefined radius constants having a different value. The operations of calculating the masses and the radiuses are done as preliminary operations to initialize. Summarizing:

Cluster 1: mass=3, radius=30;
Cluster 2: mass=2, radius=20.

Subsequently, as below described in greater detailed, the assessing and the positioning are iterated when the predefined distance value is changed.

The method further comprises assessing the clusters, by the computerized data processing unit, defining a visualization graph which represents the base graph as seen from a predefined distance value. In this regard it is assumed that such a distance value is first equal to 100 as initial step. Moreover, it is also assumed that the predefined distance ratio threshold is equal to 2. Different distance values can be used. In particular, the predefined distance value can be selected according to the user preference and can be modified, as better described in greater detail in the following.

In the following, the assessing will be described in greater detail. The assessing first comprises creating an empty visualization graph, the same visualization graph to be positioned when completed, as above described.

Taking into account the aforementioned distance value, the assessing further comprises, for each of the clusters, calculating, by the computerized data processing unit, the distance ratio as ratio between the cluster radius and the predefined distance value. Therefore, Cluster 1 has a distance ratio equal to 3.22 (defined by the ratio 100/30) and the Cluster 2 has a distance ratio equal to 5 (defined by the ratio 100/20). Summarizing:

Cluster 1: distance ratio=3.22 (defined by the ratio 100/30);
Cluster 2: distance ratio=5 (defined by the ratio 100/20).

Furthermore, the assessing comprises evaluating the distance ratio, by the same computerized data processing unit, with regard to the predefined distance ratio threshold. In the first example according to the present invention, both Cluster 1 and Cluster 2 have a distance ratio greater than said predefined distance ratio which is equal to 2.

Moreover, the assessing comprises either compressing, by the computerized data processing unit, the cluster when the distance ratio is higher than the predefined distance ratio threshold, adding in the visualization graph a single compressed cluster node for all child nodes and all child clusters arranged inside the cluster to be compressed, and expanding, by the same computerized data processing unit, the cluster when the distance ratio is lower than the predefined distance ratio threshold, adding in the visualization graph a plurality of nodes for all child nodes and all child clusters arranged inside the cluster to be expanded. Moreover, clusters whose positions is outside the visible region will always be compressed independently from the radius distance ratio. Furthermore, compressed clusters with compressed parents are neglected.

Figure 2:
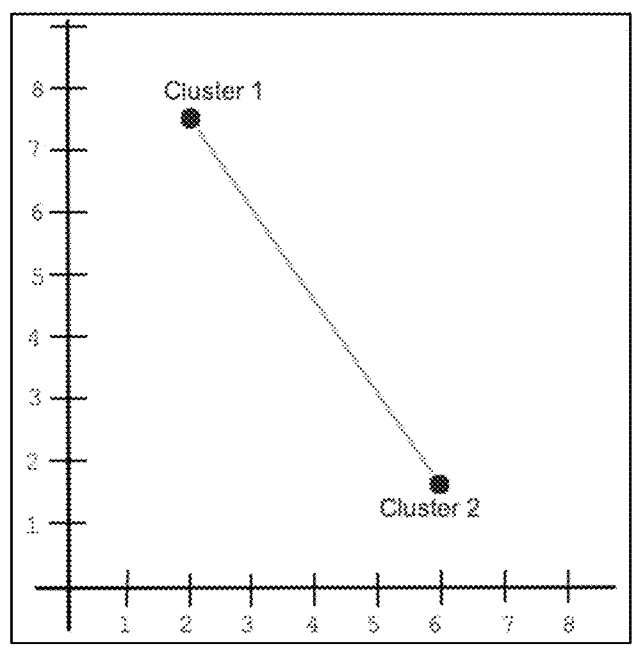
FIG. 2 shows the GUI of FIG. 1 with a graph clustering according to the present invention.

Being the distance ratio greater than said predefined distance ratio the clusters will be compressed. Therefore, each cluster is added as a cluster node to the visualization graph, as illustrated in FIG. 2:

Cluster 1: compressed-clustered node "Cluster 1" is added;
Cluster 2: compressed-clustered node "Cluster 4" is added;
the elements added to the visualization graphs can therefore be represented with the following notation:
Nodes=[{name="Cluster 1", mass=3},
{name="Cluster 2", mass=2}].

Moreover the assessing evaluates all the links of the base graph. (FIG. 1) to determine the links to be added in the visualization graph. If a link is present in the base graph between two nodes belonging to the same compressed cluster the link is not added to the visualization graph. If a link is present in the base graph between a visible node and a node inside a compressed cluster then a link is added to the visualization graph between said node and the cluster node corresponding to said compressed cluster. If a link is present in the base graph between two nodes inside two different compressed clusters then a link is added in the visualization graph between the cluster nodes corresponding to said compressed clusters. Moreover, every time a link needs to be added between the same two elements (nodes or cluster nodes) a count of a link strength is increased of an integer unit.

Therefore, link from node 1 to node 2 is not added since both nodes are inside the same Cluster 1 that is compressed. Link from node 2 to node 5 is not added since both nodes are inside the same Cluster 1 that is compressed. Link from node 1 to node 3 is added since nodes are in two different compressed clusters and the link strength is set to 1. Link from node 1 to node 4 should be added since nodes are in two different compressed clusters, but a link already exists between said clusters and so the link strength is increased from 1 to 2. Link from node 3 to node 4 is not added since both nodes are inside the same Cluster 2 that is compressed. The operation can be summarized as follow:

Link "1-2": Not added (both nodes inside Cluster 1);
Link "2-5": Not added (both nodes inside Cluster 1);
Link "1-3": Added link Cluster 1-Cluster 2 (node 1 is inside Cluster 1, node 3 is inside Cluster 2). Link strength set to 1;
Link "1-4": link Cluster 1-Cluster 2 already present (node 1 is inside Cluster 1, node 4 is inside Cluster 2). Link strength increased to 2;
Link "3-4": Not added (both nodes inside Cluster 1).

The visualization graph corresponding to the distance equal to 100 is therefore the following:
Nodes [{name "Cluster 1", mass=3},
{name="Cluster 2", mass=2}]
Links=[{nodes="Cluster 1-Cluster 2", strength=2].

The method further comprises positioning the visualization graph, such as finding the nodes and cluster nodes coordinates and comprises:
assigning to all of the nodes and of the cluster nodes an initial position;
computing the threes acting on each of the nodes and cluster nodes; defining new position for the nodes and cluster nodes by means of a velocity verlet algorithm;
storing the new positions;
iterating the computing, the defining and the storing until nodes and cluster nodes positions becomes stable.

In particular, stable means, in the present invention, that the positions are subject to small changes between two consecutive iterations.

In a further embodiment, the computing the forces acting on each of the nodes and cluster nodes comprises computing link forces of the link as:

$$Flx_{b-a}=K*S*(xc_b-xc_a)$$

$$Fly_{b-a}=K*S*(yc_b-yc_a)$$

and $$Flx_{b-a}=K*S*(xc_a-xc_b)$$

$$Fly_{b-a}=K*S*(yc_a-yc_b)$$

respectively for the two nodes or cluster nodes "a" and "b" of the link, wherein:
K is a predefined elastic constant;
S is the count of a link strength for each of the link;
$x_a$, $y_a$ are the coordinates of the "a" node;
$x_b$, $y_b$ are the coordinates of the "b" node;
$Flx_{b-a}$ is the x component of the force that node "b" exerts on node "a";
$Fly_{b-a}$ is the y component of the force that node "h" exerts on node "a";
$Flx_{a-b}$ is the x component of the force that node "a" exerts on node "b"; and
$Fly_{a-b}$ is the y component of the force that node "a" exerts on node "b".

In a further embodiment, the computing the forces acting on each of the nodes and cluster nodes comprises computing gravitational forces between each couple of the nodes and/or cluster nodes identifying the source and the receiver as:

$$Fx=G*Ms*Mr*(xs-xr)/d^3$$

$$Fy=G*Ms*Mr*(ys-yr)/d^3$$

wherein:
Ms is the mass of the source;
Mr is the mass of the receiver;
xs, ys are the coordinates of the source;
xr, yr, are the coordinates of the receiver;
d is the distance between the source and the receiver positions;
G is a predefined gravitational constant;
Fx is the x component of the force that the source exerts on the receiver; and
Fy is the y component of the force that the source exerts on the receiver.

In order to reduce computational costs said evaluation of the gravitational forces can be carried out also as described in the U.S. patent application Ser. No. 17/187,821 filed on Feb. 28, 2021, to which reference is made and which is herewith incorporated herein by reference.

In a further embodiment, the computing the forces acting on each of the nodes and cluster nodes comprises computing damping forces for each of the nodes and/or cluster nodes as:

$$Fdx=D*Vx$$

$$Fdy=D*Vy$$

wherein:
Vx is the velocity of the node along the x axis;
Vy is the velocity of the node along the y axis;
D is a predefined damping constant;
Fdx is the x component of the damping force acting on node or cluster node; and
Fdy is the y component of the damping force acting on node or cluster node.

In a further embodiment, the computing the forces acting on each of the nodes and cluster nodes comprises computing central force for each of the nodes and/or cluster nodes as:

$$Fcx = C*x + \sum_{i=0}^{N} C*level_i*(x-xc_i)$$

$$Fcy = C*y + \sum_{i=0}^{N} C*level_i*(y-yc_i)$$

wherein:
C is a predefined constant;
N is the number of cluster at which the node or cluster node recursively belongs;
$level_i$ is the level of the $i^{th}$ cluster at which the node or cluster node belongs;
$xc_i$ is the center coordinate along the x axis $i^{th}$ cluster at which the node or cluster node belongs;
$yc_i$ is the center coordinate along the y axis of the $i^{th}$ cluster at which the node or cluster node belong;
x is the coordinate of the node or cluster node along the x axis;
y is the coordinate of the node or cluster node along the y axis;
Fcx is the x component of the central force acting on node or cluster node; and
Fcy is the y component of the central force acting on node or cluster node.

It should be noted that the summatory from i=0 to N has to be extended to all the clusters that contains the node and all its parents. So, for example, if a node belong to a cluster and this cluster belong to another parent cluster that has no parent then the summatory has to include both the cluster that contain the node and its parent.

To proceed with the detailed description assume that the result of the positioning is:
Cluster 1: x=2, y=7.5;
Cluster 2: x=6, y=1.5.
Therefore, the positioned visualization graph in FIG. 2 can be represented with the following notation:
Nodes=[{name="Cluster 1", mass=3, x=2, y=7.5},
{name="Cluster 1", mass=2, x=6, y=1.5}]
Links=[{nodes="Cluster 1-Cluster 2", strength=2].

Considering a transition of the distance value from 100 to 50, corresponding to a zoom in of the GUI decreasing the observer distance.

As already described, the method comprises positioning the visualization graph in the GUI according to a selected distance value. In this regard, assuming a distance value equal to 50, the assessing comprises creating a new empty visualization graph, calculating, by the computerized data processing unit, for each of the clusters the distance ratio as ratio between the cluster radius and the predefined distance value. Therefore, Cluster 1 has a distance ratio equal to 1.67 (defined by the ratio 50/30) and the Cluster 2 has a distance ratio equal to 2.5 (defined by the ratio 50/20). Summarizing:
Cluster 1: distance ratio=1.67 (defined by the ratio 50/30)
Cluster 2: distance ratio=2.5 (defined by the ratio 50/20).

Again, the assessing comprises evaluating the distance ratio, by the same computerized data processing unit, with regard to the predefined distance ratio threshold. In this iteration of the first example according to the present invention, Cluster 2 maintains a distance ratio greater than said predefined distance ratio threshold which is equal to 2, while Cluster 1 has a distance ratio lesser than the same predefined distance ratio threshold.

Therefore, the assessing comprises expanding Cluster 1, by the same computerized data processing unit, since the distance ratio is lower than the predefined distance ratio threshold, adding in the visualization graph nodes 1, 2 and 5. On the contrary, Cluster 2 is maintained unchanged and compressed.
Summarizing:
Cluster 1: expanded—nodes 1, 2 and 5 are added;
Cluster 2: compressed—clustered node "Cluster 4" is added.

The initial visualization graph corresponding to the new distance equal to 50 include therefore the following nodes and cluster nodes:
Nodes=[{name="1", mass=1, x=2, y=7.5},
{name="2", mass=1, x=2, y=7.5},
{name="5", mass=1, x=2, y=7.5},
{name="Cluster 2", mass=2, x=6, y=1.5}].
Since nodes 1, 2 and 5 have never been positioned, their position is set to the position of the Cluster 1 as calculated above.

Assessing proceed considering the links of the base graph (FIG. 1) as follow:
Link "1-2"; Added link "1-2" (both nodes visible);
Link "2-5": Added link "2-5" (both nodes visible);
Link "1-3": Added link "1-Cluster 2" (node 1 is visible, node 3 is inside Cluster 2). Link strength set to 1;
Link "1-4": link "1-Cluster 2" already present (node 1 is visible, node 4 is inside Cluster 2). Link strength increased to 2; and
Link "3-4": Not added (both nodes inside Cluster 2).
The obtained initial visualization graph can then be represented as:
Nodes=[{name="1", mass=1, x=2, y=7.5},
{name="2", mass=1, x=2, y=7.5},
{name="5", mass=1, x=2, y=7.5},
{name="Cluster 2", mass=2, x=6, y=1.5}].
Links=[{nodes="1-2", strength=1},
{nodes="2-5", strength=1},
{nodes="1-Cluster 2", strength=2}].

Figure 3:
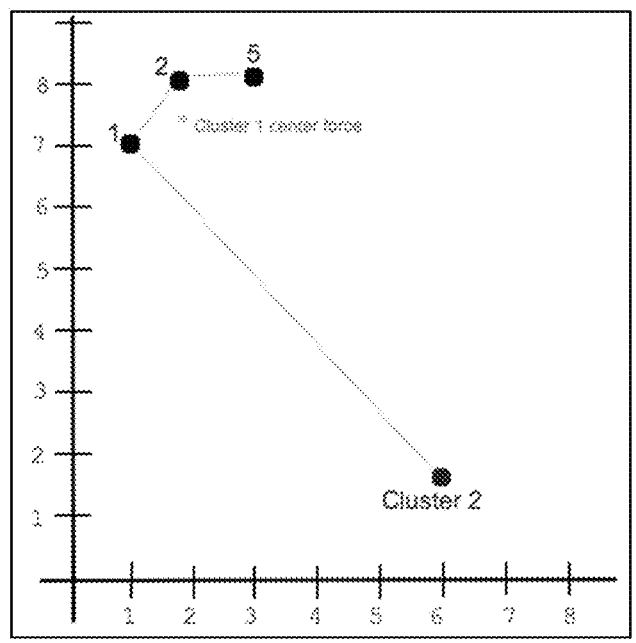
FIG. 3 shows the GUI of FIG. 2, wherein the distance value is reduced.

The positioning can then be performed with the said method, and the positioned visualization graph (FIG. 3) can be represented with the following notation:
Nodes=[{name="1", mass=1, x=1, y=7},
{name="2", mass=1, x=2, y=8.0},
{name="5", mass=1, x=3, y=8.0},
{name="Cluster 2", mass=2, x=6, y=1.5}].

It is to be noted that nodes 1, 2 and 5 remains close to the original Cluster 1 position due to center force of cluster 1 that applies to them and attract them towards the cluster center.

During the positioning the storing is also performed that computes center position of cluster 1 as average of the positions of nodes 1, 2 and 5:

$$xc_1=(1+2+3)/3=2; \text{ and}$$

$$yc_1=(7.0+8.0+8.0)/3=7.75.$$

During the positioning the storing is also performed that computes relative position of nodes inside cluster 1 in respect of cluster 1 center as difference of the node coordinate x, y and the center coordinate of cluster 1 ($xc_1$, $yc_1$)

$$xr=x-xc_1; \text{ and}$$

$$yr=y-yc_1.$$

Using the previously computed cluster coordinates ($xc_1=2$ and $yc_1=7.75$), the following relative position of the cluster elements can be obtained:
  node 1: $xr_1=1$, $yr_1=-0.75$;
  node 2: $xr_2=0$, $yr_2=0.25$; and
  node 5: $xr_5=1$, $yr_5=0.25$.

Considering now a new transition of the distance value from 50 to 100, corresponding to a zoom out of the GUI increasing the observer distance which returns to the original.

Assessing proceed as above and the visualization graph corresponding to the distance equal to 100 is therefore the same as before:
  Nodes=[{name="Cluster 1", mass=3},
    {name="Cluster 2", mass=2}]
Links=[{nodes="Cluster 1-Cluster 2", strength=2].

Initial positioning of Cluster 1 is however different since Cluster 1 was expanded in the previous step. In this regard, the initial coordinates of cluster node corresponding to Cluster 1 is set to the coordinates of cluster 1 center as computed in previously executed storing.

On the contrary, Cluster 2 remains unchanged, therefore:
  Nodes=[{name="Cluster 1", mass=3, x=2, y=7.75},
    {name="Cluster 2", mass=2, x=6, y=1.5)}].

After the iteration it assumed that the nodes move slightly, according to the positioning performed with the above-described method:
  Nodes=[{name="Cluster 1", mass=3, x=2, y=7.0},
    {name="Cluster 2", mass=2, x=6, y=1.0}]
  Links=[{nodes="Cluster 1-Cluster 2", strength=2].

Figure 4:
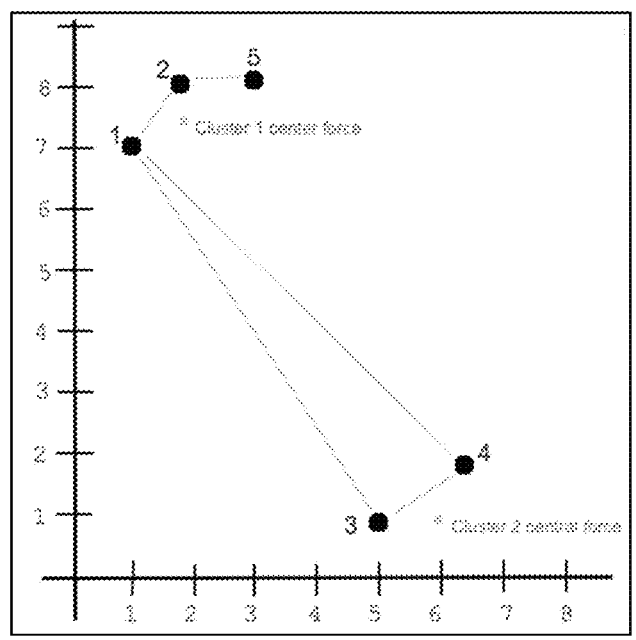
FIG. 4 shows the GUI of FIG. 3, wherein the distance value is reduced.

Considering a new transition of the distance value from 100 to 25, corresponding to a zoom in of the GUI decreasing the observer distance, FIG. 4 illustrates the corresponding new visualization graph.

In this iteration Cluster 1 is expanded as already described in the iteration above. Nodes 1, 2 and 5 are therefore added to the visualization graph but since they were already expanded in a previous step they have stored a relative position in respect of cluster center and therefore their initial position will be given by $$x_i=xr_i+xc$$

$$y_i=yr_i+yc$$

wherein:
  $xr_i$ is the coordinate of the $i^{th}$ cluster element relative to the center of the cluster node along the x axis, and
  $yr_i$ is the coordinate of the $i^{th}$ cluster element relative to the center of the cluster node along the y axis.

Using the relative positions as previously computed this results in:
  node 1: $x_1=2-1$, $y_1=7-0.75$;
  node 2: $x_2=2+0$, $y_2=7+0.25$; and
  node 5: $x_5=2+1$, $y_5=7+0.25$.

Cluster 2 is also expanded but has never been expanded in the above iterations Therefore, its child nodes take the position of the cluster node itself, as in the following:
  node 3: $x_3=6$, $y_3=1$; and
  node 4: $x_4=6$, $y_4=1$.

Assessing proceed by evaluating the links of the base graph as follow:
  Link "1-2"; Added link "1-2" (both nodes visible), strength set to 1;
  Link "2-5": Added link "2-5" (both nodes visible) strength set to 1;
  Link "1-3"; Added link "1-3" (both nodes visible) strength set to 1;
  Link "1-4"; Added link "1-4" (both nodes visible) strength set to 1; and
  Link "3-4": Added link "3-4" (both nodes visible) strength set to 1, The visualization graph becomes therefore:
  Nodes=[{name="1", mass=1, x=1, y=6.25},
    {name="2", mass=1, x=2, y=7.25},
    {name="5", mass=1, x=3, y=7.25},
    {name="3", mass=1, x=6, y=1},
    {name="4", mass=1, x=6, y=1}]
  Links=[{nodes="1-2", strength=1},
    {nodes="2-5", strength=1},
    {nodes="1-3", strength=1},
    {nodes="1-4", strength=1},
    {nodes="3-4", strength=1}].

Positioning can then define final node positions (see FIG. 4).

Figure 5:
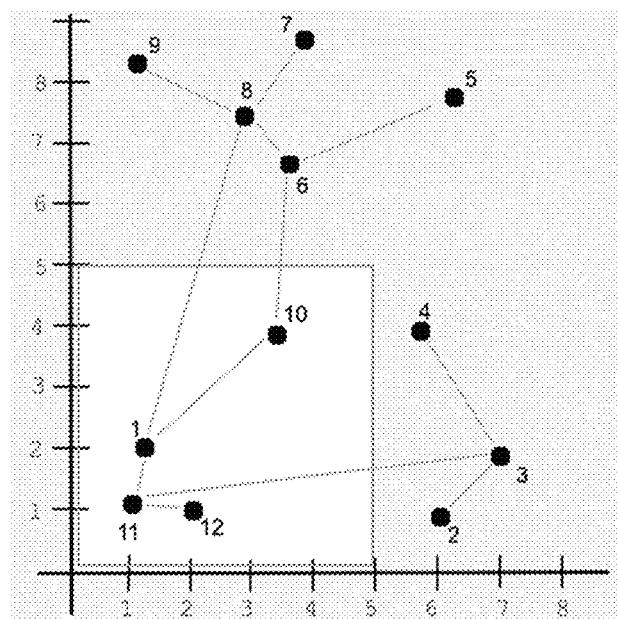
FIG. 5 shows a GUI with a second graph representing a plurality of nodes.

FIG. 5 illustrates a second example, to be processed according to the method of the present invention, which comprises twelve nodes numbered from 1 to 12. These nodes represent corresponding objects in a network.

As already described, the method comprises first retrieving a base graph comprising all of the objects of the network as respective nodes as well as the links that connect the nodes. To each of the nodes is assigned a predefined node mass which in the present example is again equal to 1 for all nodes, and to each link is assigned a unitary strength. The graph with links can be represented with the following notation:
  Nodes=[{name="1", mass=1},
    {name="2", mass=1},
    {name="3", mass=1},
    {name="4", mass=1},
    {name="5", mass=1},
    {name="6", mass=1},
    {name="7", mass=1},
    {name="8", mass=1},
    {name="9", mass=1},
    {name="10", mass=1},
    {name="11", mass=1},
    {name="12", mass=1}]
  Links=[{nodes="1-11", strength=1},
    {nodes="11-12", strength=1},
    {nodes="11-3", strength=1},
    {nodes="2-3", strength=1},
    {nodes="3-4", strength=1},
    {nodes="1-10", strength=1},
    {nodes="1-8", strength=1},
    {nodes="10-6", strength=1}, {nodes="8-9", strength=1},
{nodes="8-7", strength=1},
{nodes="8-6", strength=1},
{nodes="5-6", strength=1}].

The method further comprises grouping two or more of the nodes in one or more clusters, by the computerized data processing unit, wherein each of the clusters comprises at least two of the nodes. In particular, the nodes corresponding to the example of FIG. 5 are clustered defining the following clusters:

Cluster 1: comprises nodes 1, 10-Cluster 3 is parent cluster;
Cluster 2: comprises nodes 11, 12-Cluster 3 is the parent cluster;
Cluster 3: comprises Clusters 1, and Cluster 2—It has no parent cluster;
Cluster 4: comprises nodes 2, 3 and 4—it has no parent cluster; and
Cluster 5: comprises nodes 5, 6, 7, 8 and 9—it has no parent cluster.

In this example it is assumed that the interest is to visualize in the GUI only the portion of the graph that stay inside a given visualization window. Initially we will assume that the visualization window will be defined by the region with x and y between 0 and 5 (FIG. 5).

Subsequently, the method further comprises initializing the clusters, by the computerized data processing unit, by calculating the cluster mass and the cluster radius of each of the clusters. Therefore, considering again a predefined radius constant named KR and equal to 10, summarizing:

Cluster 1: mass=2, radius=20;
Cluster 2: mass=2, radius=20;
Cluster 3: mass=4, radius=40;
Cluster 4: mass=3, radius=30; and
Cluster 5: mass=5 radius=50.

Subsequently, a new visualization graph is generated when the selected distance value is changed, as below described in greater detailed. In particular, the assessing and the positioning are iterated when the predefined distance value is changed.

The method further comprises assessing the clusters, by the computerized data processing unit, defining a visualization graph which represents the base graph as seen from a predefined distance value. In this regard it is assumed that such a distance value is first equal to 110 as initial step. Moreover, it is also assumed that the predefined distance ratio threshold is equal to 2. Different distance values can be used. In particular, the predefined distance value can be selected according to the user preference and can be modified, as better described in greater detail in the following.

The method comprises therefore positioning the visualization graph in the GUI Said positioning can be carried out as described above and can also use the method described in the U.S. patent application Ser. No. 17/187,821 filed on Feb. 28, 2021, to which reference is made and which is herewith incorporated herein by reference.

In the following, the assessing will be described in greater detail. The assessing first comprises creating an empty visualization graph, the same visualization graph to be positioned when completed, as above described.

Taking into account the aforementioned distance value, the assessing further comprises, for each of the clusters, calculating, by the computerized data processing unit, the distance ratio as ratio between the cluster radius and the predefined distance value. Cluster with a distance ratio greater than the predefined distance ratio (equal to 2 in this example) will be compressed. Therefore:

Cluster 1: distance ratio=5.5 (defined by the ratio 110/20)—compressed;
Cluster 2: distance ratio=5.5 (defined by the ratio 110/20)—compressed;
Cluster 3: distance ratio=2.75 (defined by the ratio 110/40)—compressed;
Cluster 4: distance ratio=3.67 (defined by the ratio 110/30)—compressed; and
Cluster 5: distance ratio=2.2 (defined by the ratio 1.10/50)—compressed.

Furthermore, the assessing comprises the creation of an empty visualization graph, and successively adding nodes and cluster nodes and links to this visualization graph.

Cluster 1: compressed with a compressed parent—nothing is added;
Cluster 2: compressed with a compressed parent—nothing is added;
Cluster 3: compressed and has no parent—clustered node "Cluster 3" is added:
Cluster 4: compressed and has no parent—clustered node "Cluster 4" is added; and
Cluster 5: compressed and has no parent—clustered node "Cluster 5" is added. Clusters 3, 4 and 5 are added to the graph in a position which is random or zero since it is first initialization.

All the links of the base graph are also evaluated to determine the links to be included in the visualization graph as well as their strength. The procedure asses for each link the nodes visibility in the visualization graph and from this determines the link to be eventually added. The operation proceeds as follow:

Link "1-11": nodes are both inside Cluster 3. Link is not added. Note that node 1 is actually inside Cluster 1 and node 11 is actually inside Cluster 2, but since Cluster 1 and Cluster 2 are not visible in visualization graph the first visible parent is considered that is Cluster 3 either for Clusters 1 and 2;
Link "11-12": nodes are both inside Cluster 3. Link is not added;
Link "11-3": node 11 is inside Cluster 3 and node 3 inside Cluster 4, so the link "Cluster 3-Cluster 4" with unitary strength is added. Note that node 11 is actually inside Cluster 2, but since cluster 2 is not visible in visualization graph the first visible parent is considered that is Cluster 3;
Link "2-3": nodes are both inside Cluster 4. Link is not added;
Link "3-4": nodes are both inside Cluster 4. Link is not added;
Link "1-10": nodes are both inside Cluster 3. Link is not added;
Link "1-8: node 1 is inside Cluster 3 and node 8 inside Cluster 5, so the link "Cluster 3-Cluster 5" with unitary strength is added. Note that node 1 is actually inside Cluster 1, but since cluster 1 is not visible in visualization graph the first visible parent is considered that is Cluster 3;
Link "10-6": node 10 is inside Cluster 3 and node 6 inside Cluster 5. The link "Cluster 3-Cluster 5" is already present so its strength is increased from 1 to 2. Note that node 10 is actually inside Cluster 1, but since cluster 1 is not visible in visualization graph the first visible parent is considered that is Cluster 3;
Link "8-9": nodes are both inside Cluster 5. Link is not added;
Link "8-7": nodes are both inside Cluster 5. Link is not added;

Link "8-6": nodes are both inside Cluster 5. Link is not added; and

Link "5-6": nodes are both inside Cluster 5. Link is not added.

The obtained visualization graph is therefore the following:

Nodes [{name="Cluster 3", mass=4, x=0, y=0},
{name="Cluster 4", mass=3, x=0, y=0},
{name="Cluster 5", mass=5, x=0, y=0}].
Links [{nodes="Cluster 3-Cluster 4", strength=1},
{nodes="Cluster 3-Cluster 5", strength=2}].

Figure 6:
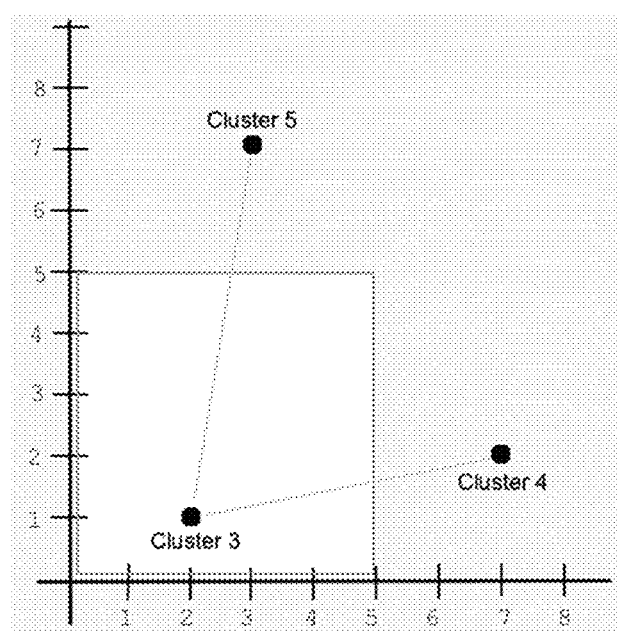
FIG. 6 shows the GUI of FIG. 5 with a graph clustering according to the present invention.

As already explained in the first example, the nodes coordinates are zero or undefined since no positioning has already been done. Such positioning can then be performed with the method described above. To speed up gravitational force evaluation it can also be used the method described in the U.S. patent application Ser. No. 17/187,821 filed on Feb. 28, 2021, which is incorporated by reference. Therefore, the visualization graph after positioning can be represented with the following notation (FIG. 6):

Nodes [{name="Cluster 3", mass=4, x=2, y=1},
{name="Cluster 4", mass=3, x=7, y=2},
{name="Cluster 5", mass=5, x=3, y=7}]
Links=[{nodes="Cluster 3-Cluster 4", strength=1},
{nodes="Cluster 3-Cluster 5", strength=2}].

Figure 7:
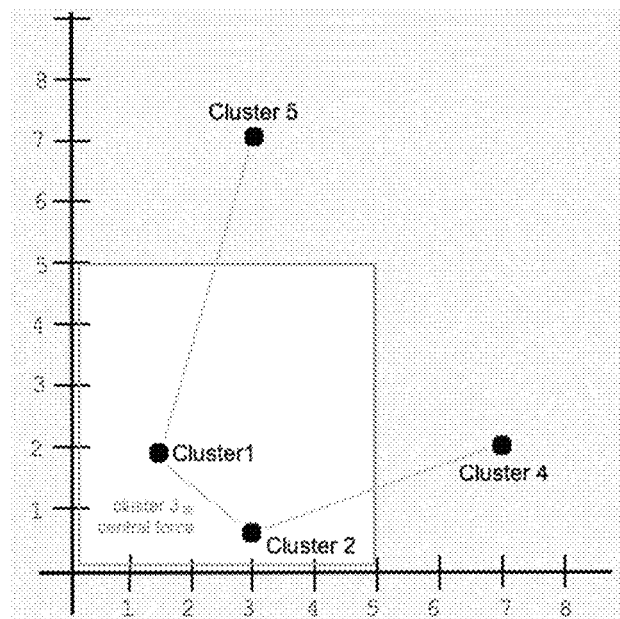
FIG. 7 shows the GUI of FIG. 6, wherein the distance value is reduced.

Considering a transition of the distance value from 110 to 70, corresponding to a zoom in of the GUI decreasing the observer distance, FIG. 7 illustrates the new visualization graph.

Assuming a distance value equal to 70, the assessing comprises, for each of the clusters, calculating, by the computerized data processing unit, the distance ratio as ratio between the cluster radius and the predefined distance value, Therefore:

Cluster 1: distance ratio=3.5 (110/20)>2—compressed;
Cluster 2: distance ratio=3.5 (110/20)>2—compressed;
Cluster 3: distance ratio=1.75 (110/40)<2—expanded;
Cluster 4: distance ratio=2.33 (110/30)>2 compressed; and
Cluster 5: distance ratio=1.4 (110/50)<2. Should be expanded but since its position is x=3, y=7 it results to be outside visualization window, so it remains compressed.

The nodes and cluster nodes of the visualization graph can be represented therefore as:

Nodes=[{name="Cluster 1", mass=2, x=2, y=1};
{name="Cluster 2", mass=2, x=2, y=1};
{name="Cluster 4", mass=3, x=7, y=2},
{name="Cluster 5", mass=5, x=3, y=7}].

Since the Cluster 1 and Cluster 2 have never been positioned, their position is set to the position of the parent Cluster 3 as calculated above (x=2, y=1).

All the links of the base graph are then evaluated to determine the links to be added in the new visualization graph. Therefore:

Link "1-11"; node 1 is inside Cluster 1 and node 11 is inside Cluster 2. The link "Cluster 1-Cluster 2" with unitary strength is added;

Link "11-12": nodes are both inside Cluster 2. Link is not added;

Link "11-3": node 11 is inside Cluster 2 and node 3 inside Cluster 4, so the link "Cluster 2-Cluster 4" with unitary strength is added;

Link "2-3": nodes are both inside Cluster 4. Link is not added;

Link "3-4": nodes are both inside Cluster 4. Link is not added;

Link "1-10": nodes are both inside Cluster 3. Link is not added;

Link "1-8: node 1 is inside Cluster land node 8 inside Cluster 5, so the link "Cluster 1-Cluster 5" with unitary strength is added;

Link "10-6": node 10 is inside Cluster 1 and node 6 inside Cluster 5. The link "Cluster 1-Cluster 5" is already present so its strength is increased from 1 to 2;

Link "8-9": nodes are both inside Cluster 5. Link is not added;

Link "8-7": nodes are both inside Cluster 5. Link is not added;

Link "8-6": nodes are both inside Cluster 5. Link is not added; and

Link "5-6": nodes are both inside Cluster 5. Link is not added.

The obtained visualization graph is therefore the following:

Nodes [{name="Cluster 1", mass=2, x=2, y=1},
{name="Cluster 2", mass=2, x=2, y=1},
{name="Cluster 4", mass=3, x=7, y=2},
{name="Cluster 5", mass=5, x=3, y=7}]
Links=[{nodes="Cluster 1-Cluster 1", strength=1},
{nodes="Cluster 2-Cluster 4", strength=1}.
{nodes="Cluster 1-Cluster 5", strength=1}].

The positioning can then be performed with the method described above. To speed up gravitational forces evaluation it can also be used the method described in the U.S. patent application Ser. No. 17/187,821 filed on Feb. 28, 2021, which is incorporated by reference. The positioned visualization graph can be represented with the following notation:

Nodes [{name="Cluster 1", mass=2, x=1.5, y=2},
{name="Cluster 2", mass=2, x=3, y=0.5},
{name="Cluster 4", mass=3, x=7, y=2},
{name="Cluster 5", mass=5, x=3, y=7}].

The positioned visualization graph is represented in FIG. 7, where it is also shown the center position of expanded Cluster 3. This center position is referred as Cluster 3 central force since it is the position used for the calculation of the central forces as above described.

Considering now a new transition of the distance value from 70 to 30, corresponding again to a zoom in of the GUI decreasing the observer distance. With such a distance value equal to 30, the assessing comprises, for each of the clusters, calculating, by the computerized data processing unit, the distance ratio as ratio between the cluster radius and the predefined distance value. Therefore:

Cluster 1: distance ratio 1.5 (30/20)<2—expanded;
Cluster 2: distance ratio 1.5 (30/20)<2—expanded;
Cluster 3: distance ratio 0.75 (30/40)<2—expanded;
Cluster 4: distance ratio 1.0 (30/30)<2 compressed since outside visualization window; and
Cluster 5: distance ratio=0.6 (30/50)<2. Compressed since outside visualization window.

The nodes added to the visualization graph are therefore
Nodes=[{name="Node 1", mass=1, x=1.5, y=2},
{name="Node 10", mass=1, x=1.5, y=2},
{name="Node 11", mass=1, x=3, y=0.5},
{name="Node 12", mass=1, x=3, y=0.5},
{name="Cluster 4", mass=3, x=7, y=2},
{name="Cluster 10", mass=5, x=3, y=7}].

The positions of nodes 1 and 10 are set both to the position of Cluster node 1 since they have never been expanded and similarly the positions of nodes 11 and 12 are set both to the position of cluster node 2 since they have never been expanded.

All the links of the base graph are also evaluated to determine the links to be added in the visualization graph. Therefore:

Link "1-11": nodes are both visible. The link "Node 1-Node 11" is added;

Link "11-12": nodes are both visible. The link "Node 11-Node 12" is added;

Link "11-3": node 11 is visible and node 3 inside Cluster 4, the link "Node 11-Cluster 4" with unitary strength is added;

Link "2-3": nodes are both inside Cluster 4. Link is not added;

Link "3-4": nodes are both inside Cluster 4. Link is not added;

Link "1-10": nodes are both visible. The link "Node 1-Node 10" is added;

Link "1-8: node 1 is visible and node 8 inside Cluster 5, so the link "Node 1-Cluster 5" with unitary strength is added;

Link "10-6": node 10 is visible and node 6 inside Cluster 5. The link "Node 10-Cluster 5" with unitary strength is added;

Link "8-9": nodes are both inside Cluster 5. Link is not added;

Link "8-7": nodes are both inside Cluster 5. Link is not added;

Link "8-6": nodes are both inside Cluster 5. Link is not added; and

Link "5-6": nodes are both inside Cluster 5. Link is not added.

The visualization graph will have therefore the following notation:

Nodes=[{name="Node 1", mass=1, x=1.5, y=2},
{name="Node 10", mass=1, x=1.5, y=2},
{name="Node 11", mass=1, x=3, y=0.5},
{name="Node 12", mass=1, x=3, y=0.5},
{name="Cluster 4", mass=3, x=7, y=2},
{name="Cluster 5", mass=5, x=3, y=7}].

Links=[{nodes="Node 1-Node 11", strength=1},
{nodes="Node 11-Node 12", strength=1},
{nodes="Node 11-Cluster 4", strength=1},
{nodes="Node 1-Node 10", strength=1},
{nodes="Node 1-Cluster 5", strength=1},
{nodes="Node 1-Cluster 5", strength=1}].

The positioning can then be performed with the method described above. To speed up calculation of die gravitational forces can also be used the method described in the U.S. patent application Ser. No. 17/187,821 filed on Feb. 28, 2021, which is incorporated by reference. The positioned visualization graph shown in FIG. 8 can be represented with the following notation:

Nodes=[{name="Node 1", mass=1, x=2, y=2},
{name="Node 10", mass=1, x=1, y=2.75},
{name="Node 11", mass=1, x=3, y=1},
{name="Node 12", mass=1, x=2, y=0.25},
{name="Cluster 4", mass=3, x=7, y=2},
{name="Cluster 5", mass=5, x=3, y=7}]

Links=[{nodes="Node 1-Node 11", strength=1},
{nodes="Node 11-Node 12", strength=1},
{nodes="Node 11-Cluster 4", strength=1},
{nodes="Node 1-Node 10", strength=1},
{nodes="Node 1-Cluster 5", strength=1},
{nodes="Node 1-Cluster 5", strength=1}].

Figure 8:
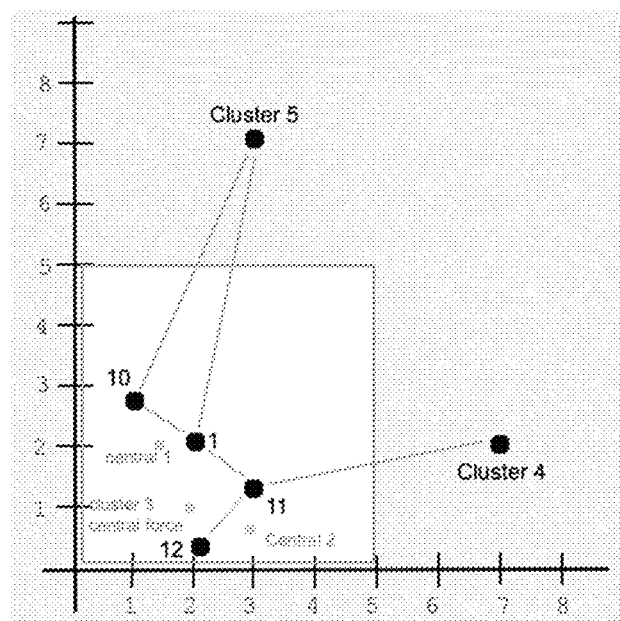
FIG. 8 shows the GUI of FIG. 7, wherein the distance value is reduced.

FIG. 8 also reports the positions of the center of the expanded cluster 1, 2 and 3 that are used to compute the central forces as below described.

Figure 9:
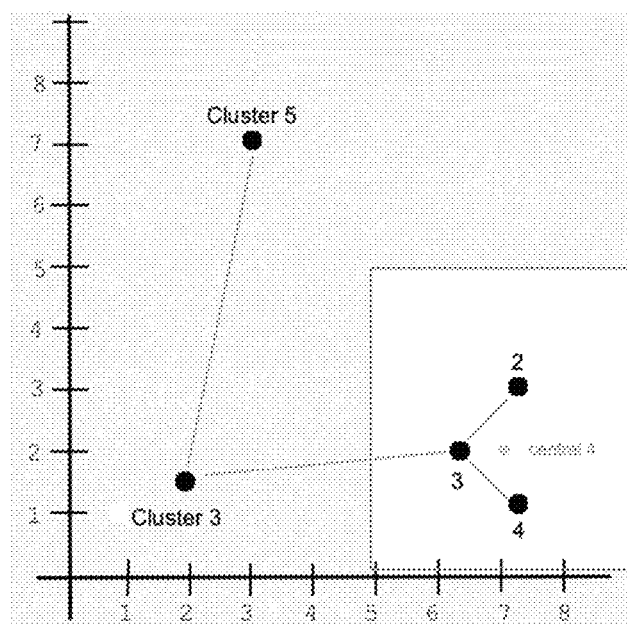
FIG. 9 shows the GUI of FIG. 8, wherein the visualization window is moved.

Finally, a moving of the visualization window is herewith considered for the same second example. In particular, the observer distance is maintained with a value equal to 30, but the visualization window is moved along the x axis to cover the region with 5<x<9 and 0<y<5. The positioned visualization graph, as well as the visualization window are shown with a white background in FIG. 9.

With such a distance value equal to 30, the assessing comprises, for each of the clusters, calculating, by the computerized data processing unit, the distance ratio as ratio between the cluster radius and the predefined distance value. Therefore:

Cluster 1: distance ratio=1.5 (30/20)<2—compressed since outside visualization window Cluster 2: distance ratio=1.5 (30/20<2—compressed since outside visualization window;

Cluster 3: distance ratio=0.75 (30/40)<2—compressed since outside visualization window;

Cluster 4: distance ratio=1.0 (30/30)<2—expanded; and

Cluster 5: distance ratio=0.6 (30/50)<2. Compressed since outside visualization window.

The nodes in the new visualization graph are therefore

Nodes=[{name="Cluster 3", mass=4, x=2, y=1.5},
{name="Node 2", mass=1, x=7, y=2},
{name="Node 3", mass=1, x=7, y=2},
{name="Node 4", mass=1, x=7, y=2},
{name="Cluster 5", mass=5, x=3, y=7}]

With regard to Cluster 1, since it was previously expanded the center of the single cluster node along the x and y axes (xc, yc) and the relative positions (xr, yr) of the nodes with respect to the center of the single cluster node have to be computed and stored as follow:

Center: xc=(2+1)/2=1.5, yc=(2+2.75)/2=2.375;
node 1: xr=2−1.5=0.5, yr=2−2.375=−0.375; and
node 10: xr=1−1.5=−0.5, yr=2.75−2.375=0.375.

With regard to Cluster 2, since it was previously expanded the center of the single cluster node along the x and y axes (xc,yc) and the relative positions (xr,yr) of the nodes with respect to the center of the single cluster node have to be computed, and stored as follow:

Center: x=(3+2)/2=2.5, y=(1+0.25)/2=0.625;
node 11: xr=3−2.5=0.5, yr=1−0.625=0.375; and
node 12: xr=2−2.5=−0.5, yr=0.25−0.625=−0.375.

With regard to Cluster 3, since it was previously expanded the center of the single cluster node along the x and y axes (xc,yc) and the relative positions (xr,yr) of its children with respect to the center of the single cluster node have to be computed and stored. The Center position is computed as the average of the positions of its children weighted by the mass, as follow:

Center: x=(2.5*2+1.5*2)/4=2, y=(0.635*2+2.37*2)/4=1.5;

Cluster 1: xr=1.5−2=−0.5, yr=2.375−1.5=0.875; and
Cluster 2: xr=2.5−2=0.5, yr=0.625−1.5=−0.875.

With regard to Nodes 2, 3 and 4, the initial position of the nodes is kept as the position of the Cluster 4 itself since it has never been expanded.

All the links of the base graph are also evaluated to determine the links to be added in the visualization graph. Therefore:

Link "1-11": nodes are both inside Cluster 3. Link is not added;

Link "11-12": nodes are both visible. Cluster 2. Link is not added;

Link "11-3": node 11 is inside Cluster 3 and node 3 is visible, the link "Cluster 3-Node 3" with unitary strength is added;

Link "2-3": nodes are both visible. The link "Node 2-Node 3" is added;
Link "3-4": nodes are both visible. The link "Node 3-Node 4" is added;
Link "1-10": nodes are both inside Cluster 3. Link is not added;
Link "1-8: node 1 is inside Cluster 3 and node 8 is inside Cluster 5, so the link "Cluster 3-Cluster 5" with unitary strength is added;
Link "10-6": node 10 is inside Cluster 3 and node 6 inside Cluster 5. The link "Cluster 3-Cluster 5" already exists so its strength is increased from 1 to 2;
Link "8-9": nodes are both inside Cluster 5. Link is not added;
Link "8-7": nodes are both inside Cluster 5. Link is not added;
Link "8-6": nodes are both inside Cluster 5. Link is not added; and
Link "5-6": nodes are both inside Cluster 5, Link is not added.

The visualization graph will have therefore the following notation:
Nodes=[{name="Cluster 3", mass=4, x=2, y=1.5},
  {name="Node 2", mass=1, x=7, y=2},
  {name="Node 3", mass=1, x=7, y=2},
  {name="Node 4", mass=1, x=7, y=2},
  {name="Cluster 5", mass=5, x=3, y=7}]
Links=[{nodes="Cluster 3-Node 3", strength=1},
  {nodes="Node 2-Node 3", strength=1},
  {nodes="Node 3-Node 4", strength=1},
  {nodes="Cluster 3-Cluster 5", strength=2].

Nodes 2, 3 and 4 since have never been previously expanded are placed initially at the position of Cluster 4. Cluster 3 is positioned instead at the coordinates as computed above.

The positioning can then be performed with the method described above. To speed up gravitational forces calculation can also be used the method described in the U.S. patent application Ser. No. 17/187,821 filed on Feb. 28, 2021, which is incorporated by reference. The positioned graph in FIG. 9 can be represented with the following notation:
Nodes [{name="Cluster 3", mass=4, x=2, y=1.5},
  {name="Node 2", mass=1, x=7.25, y=3},
  {name="Node 3", mass=1, x=6.5, y=2},
  {name="Node 4", mass=1, x=7.25, y=1},
  {name="Cluster 5", mass=5, x=3, y=7}]
Links=[{nodes="Cluster 3-Node 3", strength=1},
  {nodes="Node 2-Node 3", strength=1},
  {nodes="Node 3-Node 4", strength=1},
  {nodes="Cluster 3-Cluster 5", strength=2].

The present invention describes, therefore, a method capable to represent a large network using few computational resources by clustered graphs.

In particular, the method according to the present invention ensures that for a selected distance value or for a selected visualization window each iteration is as fast as possible since the visualized graph (visualization graph) showed in the GUI includes only the visible elements.

In particular, for the method according to the present invention three main aspects need to be considered. The method is fast enough to permit a smooth user experience in an interactive environment. The expansion and contraction operations ensure that the rest of the graph (the part that is not expanded or contracted) remains substantially unaffected, in this way it is much easier for the user to construct a mental map of represented graph and the user experience is smooth. Finally, when a cluster is contracted and then expanded the nodes return more or less to the position they had before the cluster was contracted and this ensures a smooth user experience since the user can preserve a mental map of the nodes disposition.

The method according to the present invention allows an interactive approach that permits to increase the details that are seen in a graph as soon as the user zoom in. Substantially it can be considered as dale user is looking at the graph from a given distance and when the distance decreases the number of visible details increase. The visualization graph is therefore determined by the level of details to be shown.

In order to ensure smooth positioning, expansion, and contraction, the method according to the present invention ensures that global forces acting on the graph, and that drive its positioning, are almost invariant for the expansion and contraction operations. In other words, if a cluster is expanded or contracted this should change only the local forces close to the cluster but should leave almost unchanged the forces on the rest of the graph. To achieve this target compressed clusters are treated as standard nodes (cluster nodes), with the attention that their mass is not just the mass of a single node but the sum of all the masses of the nodes inside the cluster. In this way when having a high-level view of the graph with few clusters visible, the calculations of just a few nodes is required, making the method extremely scalable.

Besides when expanding or compressing a cluster only the portion of the graph close to the cluster will be affected since the overall mass of the cluster will not change, and this will cause the pseudo gravitational forces to change only locally and remain almost invariant globally.

A similar treatment is reserved also to links, that thanks to the link strength, ensure that the force that they exert will globally not change substantially with compressed or expanded clusters.

The invention claimed is:

1. A method for representing objects of a network in a GUI with a graph clustering comprising:
   retrieving a base graph defined by an x axis and y axis and comprising all objects of said network as respective nodes and links between said nodes, wherein each of said nodes is assigned a predefined node mass;
   grouping two or more of said nodes in one or more clusters, by a computerized data processing unit, wherein each of said clusters comprises at least two of said nodes;
   initializing said clusters, by said computerized data processing unit, by calculating a cluster mass and a cluster radius for each of said clusters;
   assessing said clusters, by said computerized data processing unit, and defining a visualization graph which represents said base graph as seen from a predefined distance value; and
   positioning said visualization graph in said GUI;
   wherein the cluster mass of each of said clusters is calculated as sum of the predefined node masses of the nodes arranged inside a cluster, defining child clusters having masses, whereby the child cluster masses of all child clusters are arranged inside the cluster and define a radius, wherein said radius of each cluster is calculated as product of said cluster mass and a predefined radius constant;
   wherein said assessing comprises:
     creating the visualization graph that begins as empty;
     calculating, by said computerized data processing unit, for each of said clusters a distance ratio defined as being a ratio between said cluster radius and said predefined distance value;

comparing said distance ratio, by said computerized data processing unit, with a predefined distance ratio threshold;

compressing said cluster, by said computerized data processing unit, when said distance ratio is higher than said predefined distance ratio threshold, adding in the visualization graph a single compressed cluster node for all child nodes and all child clusters arranged inside said cluster to be compressed;

expanding said cluster, by said computerized data processing unit, when said distance ratio is lower than said predefined distance ratio threshold, adding in the visualization graph a plurality of nodes for all child nodes and all child clusters arranged inside said cluster to be expanded;

adding, by said computerized data processing unit, in the visualization graph a link between two nodes when the same link between the same two nodes is present in the base graph;

adding, by said computerized data processing unit, in said visualization graph a link between said cluster and said node outside said cluster if a link was present between a node inside said cluster and said node outside said cluster in said base graph, wherein every time a link needs to be added between the same of said cluster and of said node outside said cluster a count of a link strength is increased of an integer unit; and adding, by said computerized data processing unit, in said visualization graph a link between two of said clusters when a link is present between a node inside one of said clusters and a node inside the other of said clusters in said base graph, wherein every time a link needs to be added between the same of two of said clusters a count of a link strength is increased of an integer unit.

2. The method for representing objects of the network in the GUI with a graph clustering according to claim 1, wherein said assessing and said positioning are iterated when said predefined distance value is changed.

3. The method for representing objects of the network in the GUI with a graph clustering according to claim 1, wherein in said assessing said clusters are compressed when they are outside a predefined visualization window as a portion of the two-dimensional space in which the visualization graph is visualized in said GUI.

4. The method for representing objects of the network in the GUI with a graph clustering according to claim 1, wherein said positioning of the visualization graph comprises:

assigning initial position to all of said nodes and of said cluster nodes;

computing forces acting on each of said nodes and cluster nodes;

defining new position for said nodes and cluster nodes by means of a velocity verlet algorithm;

storing said new positions and defining a center for each cluster;

iterating said computing, said defining and said storing until said nodes and said cluster nodes positions become stable.

5. The method for representing objects of the network in the GUI with a graph clustering according to claim 4, wherein said assigning initial position consists of assigning to all of said nodes and of said cluster nodes inside an expanded of said clusters defining coordinates of the cluster node position when said cluster has never been expanded before.

6. The method for representing objects of the network in the GUI with a graph clustering according to claim 4, wherein said assigning initial position consists of assigning to all of said nodes and of said cluster nodes inside an expanded of said clusters coordinates of relative positions with respect to said cluster center position when the cluster has already been expanded.

7. The method for representing objects of the network in the GUI with a graph clustering according to claim 6, wherein said storing comprises memorizing said cluster center positions being coordinates calculated as:

$$xc = \frac{\sum_{i=0}^{n} m_i * x_i}{\sum_{i=0}^{n} m_i} \quad yc = \frac{\sum_{i=0}^{n} m_i * y_i}{\sum_{i=0}^{n} m_i}$$

wherein:
xc defines coordinate of cluster center along the x axis;
yc defines coordinate of duster center along the y axis;
$m_i$ is the mass of the $i^{th}$ cluster element inside the cluster;
$x_i$ defines coordinate of the $i^{th}$ cluster element along the x axis;
$y_i$ defines coordinate of the $i^{th}$ cluster element along the y axis; and
n is the number of elements inside the cluster.

8. The method for representing objects of the network in the GUI with a graph clustering according to claim 7, wherein said storing comprises memorizing said relative positions as coordinates being calculated as:

$$xr_i = x_i - xc$$

$$yr_i = y_i - yc$$

wherein:
$xr_i$ defines coordinate of the $i^{th}$ cluster element relative to coordinate of the cluster center along the x axis;
$yr_i$ defines coordinate of the $i^{th}$ cluster element relative to coordinate of the cluster center along the y axis;
xc defines coordinate of cluster center along the x axis;
yc defines coordinate of cluster center along the y axis;
$x_i$ defines coordinate of the $i^{th}$ cluster element along the x axis; and
$y_i$ defines coordinate of the $i^{th}$ cluster element along the y axis.

9. The method for representing objects of the network in the GUI with a graph clustering according to claim 4, wherein the computation of forces acting on each of said nodes and cluster nodes comprises computing link forces of said link as:

$$Flx_{b-a} = K*S*(x_b - x_a)$$

$$Fly_{b-a} = K*S*(y_b - y_a)$$

and $$Flx_{a-b} = K*S*(x_a - x_b)$$

$$Fly_{a-b} = K*S*(y_a - y_b)$$

respectively for said two nodes or cluster nodes "a" and "b" that form said link, wherein:
K is a predefined elastic constant;
S is said link strength for each of said link;

$x_a$, $y_a$ defines coordinates of the "a" node;
$x_b$, $y_b$ defines coordinates of the "b" node;
$Flx_{b-a}$ is the x component of force that node "b" exerts on node "a";
$Fly_{b-a}$ is the y component of force that node "b" exerts on node "a";
$Flx_{a-b}$ is the x component of force that node "a" exerts on node "b"; and
$Fly_{a-b}$ is the y component of force that node "a" exerts on node "b".

10. The method for representing objects of the network in the GUI with a graph clustering according to claim 4, wherein the computation of forces acting on each of said nodes and cluster nodes comprises computing gravitational forces between each couple of said nodes and/or cluster nodes identifying a source and receiver as:

$$Fx = G*Ms*Mr(xs-xr)/d\hat{}3$$

$$Fy = G*Ms*Mr(ys-yr)/d\hat{}3$$

wherein:
Ms is the mass of said source;
Mr is the mass of said receiver;
xs, ys define coordinates of said source;
xr, yr define coordinates of said receiver;
d is the distance between said source and said receiver positions;
G is a predefined gravitational constant;
Fx is the x component of force that the source exerts on the receiver; and
Fy is the y component of force that the source exerts on the receiver.

11. The method for representing objects of the network in the GUI with a graph clustering according to claim 4, wherein said computing forces acting on each of said nodes and cluster nodes comprises computing a damping force for each of said nodes and/or cluster nodes as:

$$Fdx = D*Vx$$

$$Fdy = D*Vy$$

wherein:
Vx is velocity of the node or cluster node along said x axis;
Vy is velocity of the node or cluster node along said y axis;
D is a predefined damping constant;
Fdx is the x component of the damping force acting on the node or cluster node; and
Fdy is the y component of the damping force acting on the node or cluster node.

12. The method for representing objects of the network in the GUI with a graph clustering according to claim 4, wherein said forces acting on each of said nodes and cluster nodes comprises computing a central force for each of said nodes and/or cluster nodes as:

$$Fcx = C*x + \sum_{i=0}^{N} C * \text{level}_i * (x - xc_i)$$

$$Fcy = C*y + \sum_{i=0}^{N} C * \text{level}_i * (y - yc_i)$$

wherein:
C is a predefined constant;
N is the number of clusters at which the node or cluster node recursively belongs;
$\text{Level}_i$ is the level of the $i^{th}$ cluster at which the node or cluster node belongs;
$xc_i$ is the center coordinate along the x axis $i^{th}$ cluster at which the node or cluster node belongs;
$yc_i$ is the center coordinate along the y axis of the $i^{th}$ cluster at which the node or cluster node belongs;
x defines coordinate of the node or cluster node along the x axis;
y defines coordinate of the node or cluster node along the y axis;
Fcx is the x component of a central force acting on the node or cluster node; and
Fcy is the y component of a central force acting on node or cluster node.

* * * * *